United States Patent
Han et al.

(10) Patent No.: US 9,123,359 B1
(45) Date of Patent: Sep. 1, 2015

(54) MAGNETIC RECORDING TRANSDUCER WITH SPUTTERED ANTIFERROMAGNETIC COUPLING TRILAYER BETWEEN PLATED FERROMAGNETIC SHIELDS AND METHOD OF FABRICATION

(75) Inventors: Dehua Han, Fremont, CA (US); Ming Sun, Pleasanton, CA (US); Feng Liu, San Ramon, CA (US); Jinqiu Zhang, Fremont, CA (US); Shaoping Li, San Ramon, CA (US); Lieping Zhong, San Jose, CA (US); Xiaoqi Liu, Milpitas, CA (US); Tao Pan, San Jose, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 291 days.

(21) Appl. No.: 12/976,916

(22) Filed: Dec. 22, 2010

(51) Int. Cl.
*G11B 5/127* (2006.01)

(52) U.S. Cl.
CPC ................. *G11B 5/1278* (2013.01)

(58) Field of Classification Search
CPC ............................ G11B 5/127; G11B 5/1278
USPC .................................. 360/125.3, 125.71, 319
See application file for complete search history.

(56) References Cited

U.S. PATENT DOCUMENTS

| | | | |
|---|---|---|---|
| 5,621,592 A | 4/1997 | Gill et al. | |
| 5,750,275 A | 5/1998 | Katz et al. | |
| 5,838,521 A | 11/1998 | Ravipati | |
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,087,027 A | 7/2000 | Hoshiya et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |
| 6,134,089 A | 10/2000 | Barr et al. | |
| 6,136,166 A | 10/2000 | Shen et al. | |

(Continued)

*Primary Examiner* — Julie Anne Watko

(57) ABSTRACT

A magnetic recording transducer for use in a data storage device is described. The transducer has a main writer pole and magnetic shields adjacent to the main writer pole. The magnetic shields include a first plated soft ferromagnetic layer, a second plated soft ferromagnetic layer, and an antiferromagnetic coupling (AFC) trilayer between the first plated soft ferromagnetic layer and the second plated soft ferromagnetic layer. The AFC trilayer includes a first AFC layer of sputtered ferromagnetic material; a second AFC layer of a nonmagnetic antiferromagnetic exchange material, and a third AFC layer of sputtered ferromagnetic material. Shields with AFC trilayers in leading, side, and/or trailing shields, as well as between shields are provided. A method of fabricating is also provided.

19 Claims, 11 Drawing Sheets

(56) References Cited

U.S. PATENT DOCUMENTS

| | | | |
|---|---|---|---|
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,259,583 B1 | 7/2001 | Fontana, Jr. et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,292,334 B1 | 9/2001 | Koike et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,358,635 B1 | 3/2002 | Min et al. |
| 6,359,779 B1 | 3/2002 | Frank, Jr. et al. |
| 6,369,983 B1 | 4/2002 | Hong |
| 6,373,667 B1 | 4/2002 | Han et al. |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,437,949 B1 | 8/2002 | Macken et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,456,467 B1 | 9/2002 | Mao et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,496,335 B2 | 12/2002 | Gill |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,628,478 B2 | 9/2003 | Gill |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |

(56) References Cited

U.S. PATENT DOCUMENTS

| | | |
|---|---|---|
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,796 B2 | 9/2004 | Shukh et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,818,330 B2 * | 11/2004 | Shukh et al. ............ 428/828 |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,927,952 B2 | 8/2005 | Shimizu et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,967,823 B2 | 11/2005 | Nakamoto et al. |
| 6,969,989 B1 | 11/2005 | Mei |
| 6,975,486 B2 | 12/2005 | Chen et al. |
| 6,980,403 B2 | 12/2005 | Hasegawa |
| 6,987,643 B1 | 1/2006 | Seagle |
| 6,989,962 B1 | 1/2006 | Dong et al. |
| 6,989,972 B1 | 1/2006 | Stoev et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,487 B2 | 5/2006 | Terunuma |
| 7,046,490 B1 | 5/2006 | Ueno et al. |
| 7,054,113 B1 | 5/2006 | Seagle et al. |
| 7,057,853 B2 | 6/2006 | Okada et al. |
| 7,057,857 B1 | 6/2006 | Niu et al. |
| 7,059,868 B1 | 6/2006 | Yan |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,723 B2 | 1/2007 | Taguchi |
| 7,170,725 B1 | 1/2007 | Zhou et al. |
| 7,177,117 B1 | 2/2007 | Jiang et al. |
| 7,180,712 B1 | 2/2007 | Li et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,295,401 B2 | 11/2007 | Jayasekara et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,309 B1 | 1/2008 | Wiesen et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,382,574 B1 | 6/2008 | Li et al. |
| 7,386,933 B1 | 6/2008 | Krounbi et al. |
| 7,389,577 B1 | 6/2008 | Shang et al. |
| 7,417,832 B1 | 8/2008 | Erickson et al. |

(56) References Cited

U.S. PATENT DOCUMENTS

| | | |
|---|---|---|
| 7,419,891 B1 | 9/2008 | Chen et al. |
| 7,426,091 B2 | 9/2008 | Okada et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,446,979 B2 | 11/2008 | Jayasekara |
| 7,457,080 B2 | 11/2008 | Watabe et al. |
| 7,493,688 B1 | 2/2009 | Wang et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,394 B2 | 6/2009 | Sasaki et al. |
| 7,551,406 B1 | 6/2009 | Thomas et al. |
| 7,552,523 B1 | 6/2009 | He et al. |
| 7,554,765 B2 | 6/2009 | Shukh et al. |
| 7,554,767 B1 | 6/2009 | Hu et al. |
| 7,583,466 B2 | 9/2009 | Kermiche et al. |
| 7,595,967 B1 | 9/2009 | Moon et al. |
| 7,606,007 B2 | 10/2009 | Gill |
| 7,639,457 B1 | 12/2009 | Chen et al. |
| 7,660,080 B1 | 2/2010 | Liu et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,773,341 B2 | 8/2010 | Zhang et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,968,219 B1 | 6/2011 | Jiang et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,024,748 B1 | 9/2011 | Moravec et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,125,856 B1 | 2/2012 | Li et al. |
| 8,134,794 B1 | 3/2012 | Wang |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,248 B1 | 7/2012 | Li et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,517 B1 | 10/2012 | Sun et al. |
| 8,288,204 B1 | 10/2012 | Wang et al. |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |
| 8,322,023 B1 | 12/2012 | Zeng et al. |
| 8,325,569 B1 | 12/2012 | Shi et al. |
| 8,333,008 B1 | 12/2012 | Sin et al. |
| 8,334,093 B2 | 12/2012 | Zhang et al. |
| 8,336,194 B2 | 12/2012 | Yuan et al. |
| 8,339,738 B1 | 12/2012 | Tran et al. |
| 8,341,826 B1 | 1/2013 | Jiang et al. |
| 8,343,319 B1 | 1/2013 | Li et al. |
| 8,343,364 B1 | 1/2013 | Gao et al. |
| 8,349,195 B1 | 1/2013 | Si et al. |
| 8,351,307 B1 | 1/2013 | Wolf et al. |
| 8,357,244 B1 | 1/2013 | Zhao et al. |
| 8,373,945 B1 | 2/2013 | Luo et al. |
| 8,375,564 B1 | 2/2013 | Luo et al. |
| 8,375,565 B2 | 2/2013 | Hu et al. |
| 8,381,391 B2 | 2/2013 | Park et al. |

(56) References Cited

U.S. PATENT DOCUMENTS

| | | |
|---|---|---|
| 8,385,157 B1 | 2/2013 | Champion et al. |
| 8,385,158 B1 | 2/2013 | Hu et al. |
| 8,394,280 B1 | 3/2013 | Wan et al. |
| 8,400,731 B1 | 3/2013 | Li et al. |
| 8,402,635 B2 | 3/2013 | Degawa et al. |
| 8,404,128 B1 | 3/2013 | Zhang et al. |
| 8,404,129 B1 | 3/2013 | Luo et al. |
| 8,405,930 B1 | 3/2013 | Li et al. |
| 8,409,453 B1 | 4/2013 | Jiang et al. |
| 8,413,317 B1 | 4/2013 | Wan et al. |
| 8,416,540 B1 | 4/2013 | Li et al. |
| 8,419,953 B1 | 4/2013 | Su et al. |
| 8,419,954 B1 | 4/2013 | Chen et al. |
| 8,422,176 B1 | 4/2013 | Leng et al. |
| 8,422,342 B1 | 4/2013 | Lee |
| 8,422,841 B1 | 4/2013 | Shi et al. |
| 8,424,192 B1 | 4/2013 | Yang et al. |
| 8,441,756 B1 | 5/2013 | Sun et al. |
| 8,443,510 B1 | 5/2013 | Shi et al. |
| 8,444,866 B1 | 5/2013 | Guan et al. |
| 8,449,948 B2 | 5/2013 | Medina et al. |
| 8,451,556 B1 | 5/2013 | Wang et al. |
| 8,451,563 B1 | 5/2013 | Zhang et al. |
| 8,454,846 B1 | 6/2013 | Zhou et al. |
| 8,455,119 B1 | 6/2013 | Jiang et al. |
| 8,456,961 B1 | 6/2013 | Wang et al. |
| 8,456,963 B1 | 6/2013 | Hu et al. |
| 8,456,964 B1 | 6/2013 | Yuan et al. |
| 8,456,966 B1 | 6/2013 | Shi et al. |
| 8,456,967 B1 | 6/2013 | Mallary |
| 8,458,892 B2 | 6/2013 | Si et al. |
| 8,462,592 B1 | 6/2013 | Wolf et al. |
| 8,468,682 B1 | 6/2013 | Zhang |
| 8,472,288 B1 | 6/2013 | Wolf et al. |
| 8,480,911 B1 | 7/2013 | Osugi et al. |
| 8,486,285 B2 | 7/2013 | Zhou et al. |
| 8,486,286 B1 | 7/2013 | Gao et al. |
| 8,488,272 B1 | 7/2013 | Tran et al. |
| 8,491,801 B1 | 7/2013 | Tanner et al. |
| 8,491,802 B1 | 7/2013 | Gao et al. |
| 8,493,693 B1 | 7/2013 | Zheng et al. |
| 8,493,695 B1 | 7/2013 | Kaiser et al. |
| 8,495,813 B1 | 7/2013 | Hu et al. |
| 8,498,084 B1 | 7/2013 | Leng et al. |
| 8,506,828 B1 | 8/2013 | Osugi et al. |
| 8,514,517 B1 | 8/2013 | Batra et al. |
| 8,518,279 B1 | 8/2013 | Wang et al. |
| 8,518,832 B1 | 8/2013 | Yang et al. |
| 8,520,336 B1 | 8/2013 | Liu et al. |
| 8,520,337 B1 | 8/2013 | Liu et al. |
| 8,524,068 B2 | 9/2013 | Medina et al. |
| 8,526,275 B1 | 9/2013 | Yuan et al. |
| 8,531,801 B1 | 9/2013 | Xiao et al. |
| 8,532,450 B1 | 9/2013 | Wang et al. |
| 8,533,937 B1 | 9/2013 | Wang et al. |
| 8,537,494 B1 | 9/2013 | Pan et al. |
| 8,537,495 B1 | 9/2013 | Luo et al. |
| 8,537,502 B1 | 9/2013 | Park et al. |
| 8,545,999 B1 | 10/2013 | Leng et al. |
| 8,547,659 B1 | 10/2013 | Bai et al. |
| 8,547,667 B1 | 10/2013 | Roy et al. |
| 8,547,730 B1 | 10/2013 | Shen et al. |
| 8,555,486 B1 | 10/2013 | Medina et al. |
| 8,559,141 B1 | 10/2013 | Pakala et al. |
| 8,563,146 B1 | 10/2013 | Zhang et al. |
| 8,565,049 B1 | 10/2013 | Tanner et al. |
| 8,576,517 B1 | 11/2013 | Tran et al. |
| 8,578,594 B2 | 11/2013 | Jiang et al. |
| 8,582,238 B1 | 11/2013 | Liu et al. |
| 8,582,241 B1 | 11/2013 | Yu et al. |
| 8,582,253 B1 | 11/2013 | Zheng et al. |
| 8,588,039 B1 | 11/2013 | Shi et al. |
| 8,593,914 B2 | 11/2013 | Wang et al. |
| 8,597,528 B1 | 12/2013 | Roy et al. |
| 8,599,520 B1 | 12/2013 | Liu et al. |
| 8,599,657 B1 | 12/2013 | Lee |
| 8,603,593 B1 | 12/2013 | Roy et al. |
| 8,607,438 B1 | 12/2013 | Gao et al. |
| 8,607,439 B1 | 12/2013 | Wang et al. |
| 8,611,035 B1 | 12/2013 | Bajikar et al. |
| 8,611,054 B1 | 12/2013 | Shang et al. |
| 8,611,055 B1 | 12/2013 | Pakala et al. |
| 8,614,864 B1 | 12/2013 | Hong et al. |
| 8,619,512 B1 | 12/2013 | Yuan et al. |
| 8,625,233 B1 | 1/2014 | Ji et al. |
| 8,625,941 B1 | 1/2014 | Shi et al. |
| 8,628,672 B1 | 1/2014 | Si et al. |
| 8,630,068 B1 | 1/2014 | Mauri et al. |
| 8,634,280 B1 | 1/2014 | Wang et al. |
| 8,638,529 B1 | 1/2014 | Leng et al. |
| 8,643,980 B1 | 2/2014 | Fowler et al. |
| 8,649,123 B1 | 2/2014 | Zhang et al. |
| 8,665,561 B1 | 3/2014 | Knutson et al. |
| 8,670,211 B1 | 3/2014 | Sun et al. |
| 8,670,213 B1 | 3/2014 | Zeng et al. |
| 8,670,214 B1 | 3/2014 | Knutson et al. |
| 8,670,294 B1 | 3/2014 | Shi et al. |
| 8,670,295 B1 | 3/2014 | Hu et al. |
| 8,675,318 B1 | 3/2014 | Ho et al. |
| 8,675,455 B1 | 3/2014 | Krichevsky et al. |
| 8,681,594 B1 | 3/2014 | Shi et al. |
| 8,689,430 B1 | 4/2014 | Chen et al. |
| 8,693,141 B1 | 4/2014 | Elliott et al. |
| 8,703,397 B1 | 4/2014 | Zeng et al. |
| 8,705,205 B1 | 4/2014 | Li et al. |
| 2001/0043446 A1 | 11/2001 | Barlow et al. |
| 2002/0149886 A1 | 10/2002 | Gill |
| 2003/0028841 A1* | 2/2003 | Rushton et al. ............... 714/781 |
| 2004/0120074 A1 | 6/2004 | Okada et al. |
| 2005/0013044 A1 | 1/2005 | Hirata et al. |
| 2006/0044682 A1* | 3/2006 | Le et al. .................. 360/126 |
| 2006/0109592 A1 | 5/2006 | Watanabe et al. |
| 2006/0119981 A1 | 6/2006 | Li et al. |
| 2007/0019341 A1 | 1/2007 | Mizuno et al. |
| 2008/0013221 A1 | 1/2008 | Ohta et al. |
| 2009/0052092 A1 | 2/2009 | Zhou et al. |
| 2009/0168240 A1* | 7/2009 | Hsiao et al. ............. 360/125.02 |
| 2009/0174971 A1 | 7/2009 | Tsuchiya et al. |
| 2009/0279213 A1 | 11/2009 | Wu et al. |
| 2010/0079917 A1 | 4/2010 | Miyauchi et al. |
| 2010/0290157 A1 | 11/2010 | Zhang et al. |
| 2011/0086240 A1 | 4/2011 | Xiang et al. |
| 2011/0097601 A1* | 4/2011 | Bai et al. .................. 428/815 |
| 2011/0273802 A1 | 11/2011 | Zhou et al. |
| 2012/0087046 A1 | 4/2012 | Yanagisawa et al. |
| 2012/0111826 A1 | 5/2012 | Chen et al. |
| 2012/0134057 A1 | 5/2012 | Song et al. |
| 2012/0216378 A1 | 8/2012 | Emley et al. |
| 2012/0237878 A1 | 9/2012 | Zeng et al. |
| 2012/0298621 A1 | 11/2012 | Gao |
| 2013/0216702 A1 | 8/2013 | Kaiser et al. |
| 2013/0216863 A1 | 8/2013 | Li et al. |
| 2013/0257421 A1 | 10/2013 | Shang et al. |

* cited by examiner

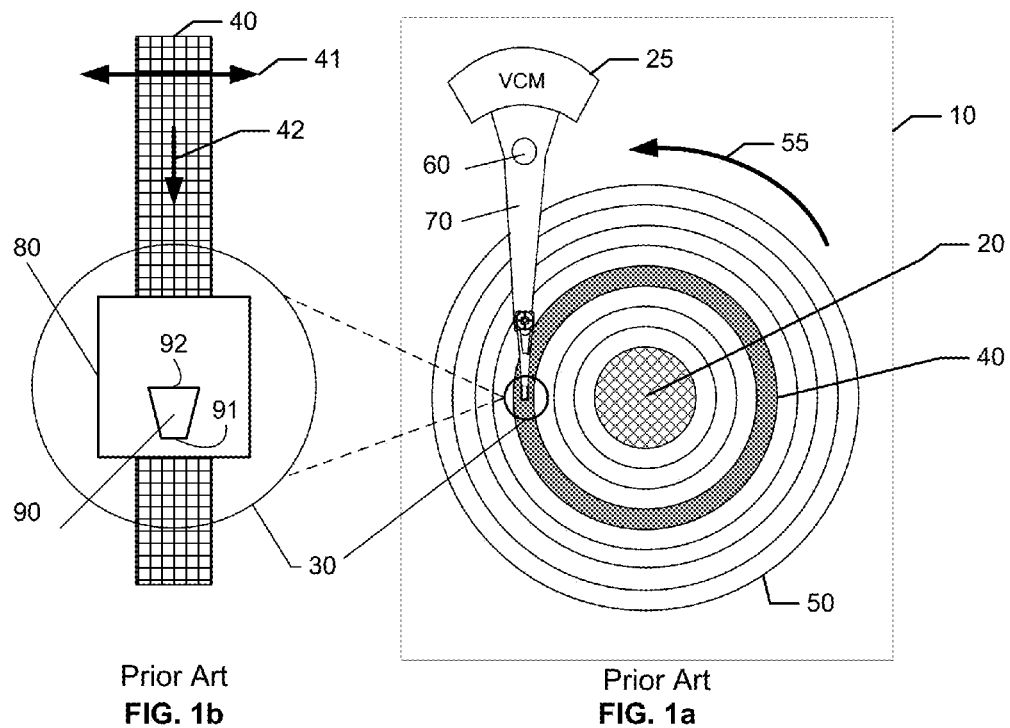
Prior Art
FIG. 1b
Prior Art
FIG. 1a
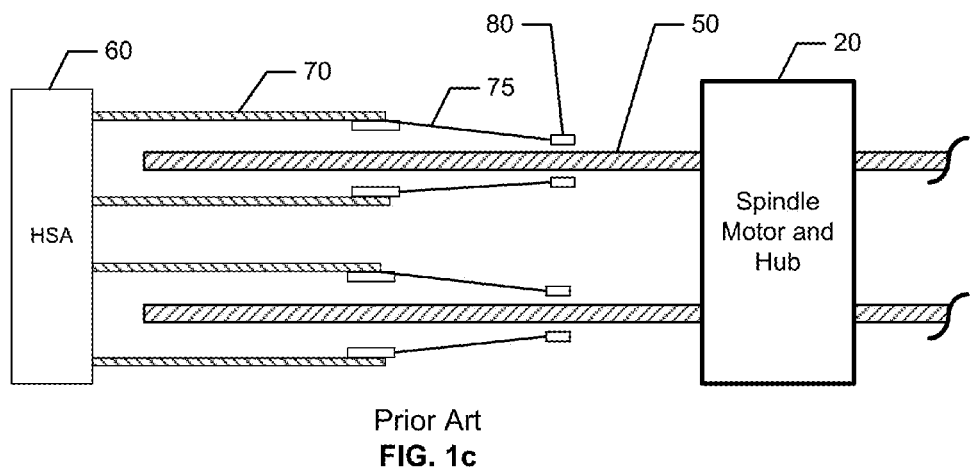
Prior Art
FIG. 1c

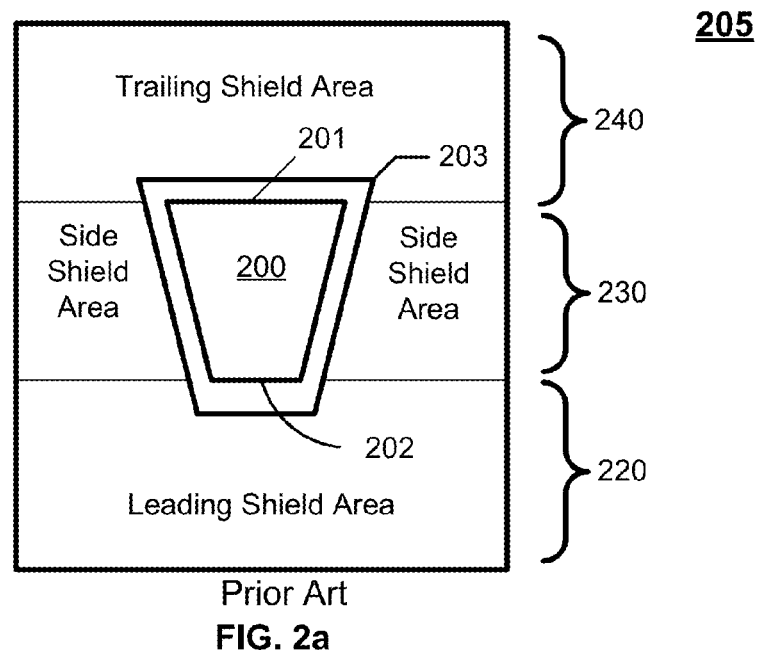
Prior Art
FIG. 2a
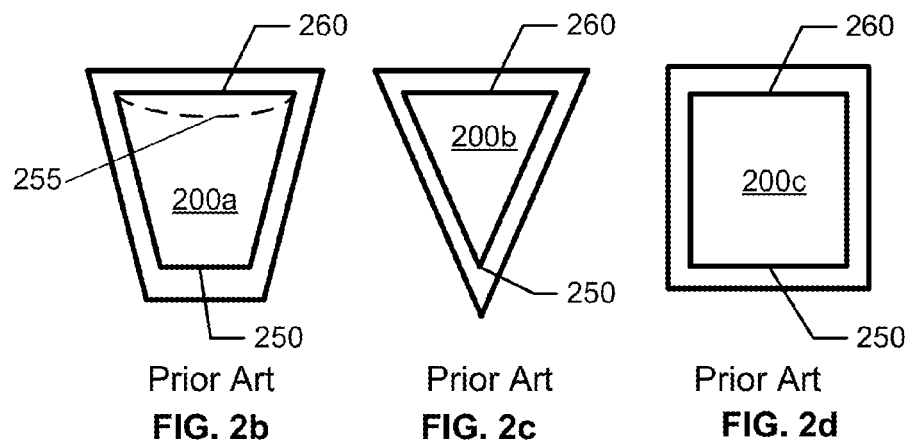
Prior Art
FIG. 2b
Prior Art
FIG. 2c
Prior Art
FIG. 2d

MAGNETIC RECORDING TRANSDUCER WITH SPUTTERED ANTIFERROMAGNETIC COUPLING TRILAYER BETWEEN PLATED FERROMAGNETIC SHIELDS AND METHOD OF FABRICATION

BACKGROUND

FIG. 1a illustrates a conventional disk drive 10 used for data storage. FIGS. 1a, 1b and 1c are not drawn to scale and only certain structures are depicted for clarity. Disk media 50 is attached to spindle motor and hub 20. The spindle motor and hub 20 rotate the media 50 in a direction shown by arrow 55. Head Stack assembly (HSA) 60 includes a magnetic recording head 30 on actuator arm 70 and positions actuator arm 70 by positioning the voice coil motor (VCM) 25 over a desired data track, shown as recording track 40 in this example, to write data onto the media 50.

FIG. 1b illustrates an enlarged view of area 30 of FIG. 1a. A magnetic recording transducer 90 is fabricated on slider 80. Slider 80 may be attached to suspension 75 and suspension 75 may be attached to actuator arm 70 as shown in FIG. 1c.

Referring again to FIG. 1b, Slider 80 is illustrated above recording track 40. Media 50 and track 40 are moving under slider 80 in an in-track direction shown by arrow 42. The cross-track direction is shown by arrow 41.

The magnetic recording transducer 90 has a leading edge 91 and a trailing edge 92. In this embodiment, the trailing edge 92 of recording transducer 90 is the final portion of magnetic transducer 90 that writes onto the recording track 40 as the media moves under the slider 80 in direction 42.

FIG. 1c illustrates a side view of the disk drive 10 shown in FIG. 1a. At least one disk media 50 is mounted onto spindle motor and hub 20. HSA 60 comprises at least one actuator arm 70 that carries suspension 75 and slider 80. Slider 80 has an air bearing surface (ABS) facing media 50. When the media is rotating and actuator arm 70 is positioned over the media 50, slider 80 floats above media 50 by aerodynamic pressure created between the slider ABS and the surface of media 50 facing the ABS of slider 80.

BRIEF SUMMARY

A magnetic recording transducer for use in a data storage device is described. The transducer has a main writer pole and magnetic shields adjacent to the main writer pole. The magnetic shields include a first plated soft ferromagnetic layer, a second plated soft ferromagnetic layer, and an antiferromagnetic coupling (AFC) trilayer between the first plated soft ferromagnetic layer and the second plated soft ferromagnetic layer. The AFC trilayer includes a first AFC layer of sputtered ferromagnetic material; a second AFC layer of a nonmagnetic antiferromagnetic exchange material, and a third AFC layer of sputtered ferromagnetic material. Shields with AFC trilayers in leading, side, and/or trailing shields, as well as between shields are provided. A method of fabricating is also provided.

BRIEF DESCRIPTION OF THE DRAWINGS

FIG. 1a illustrates a conventional disk drive in a top view.
FIG. 1b illustrates a more detailed view of an area shown in FIG. 1a.
FIG. 1c illustrates side view of the disk drive shown in FIG. 1a.
FIG. 2a illustrates a main writer pole and shield areas.

FIGS. 2b-d illustrate examples of main pole shapes with leading and trailing edges.

DETAILED DESCRIPTION OF THE EMBODIMENTS

Figure 3:
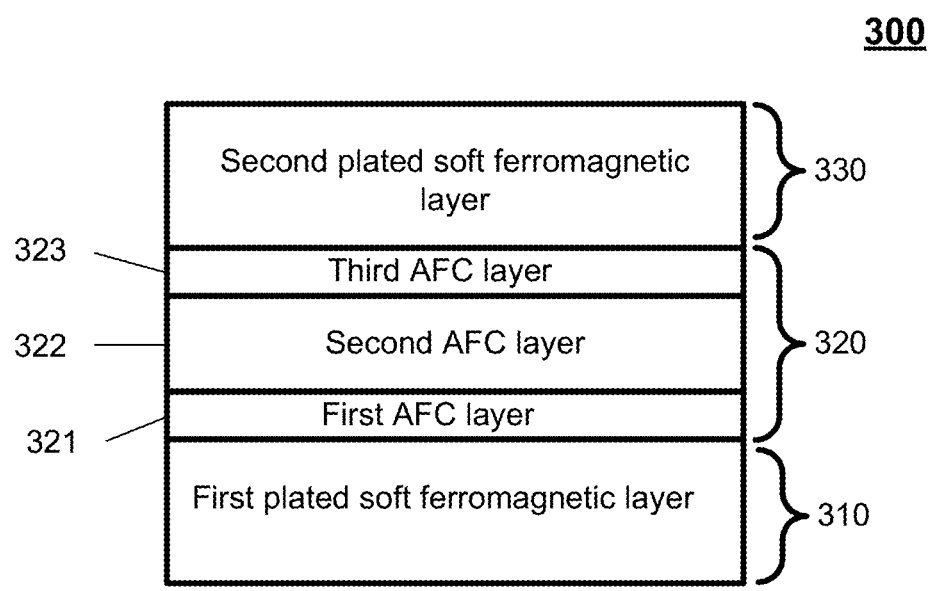
FIG. 3 illustrates an embodiment of the invention with plated ferromagnetic layers separated by an AFC trilayer.

FIG. 2a illustrates an ABS view of a main pole 200 of magnetic recording transducer 205. The ABS view is the view looking at the ABS from the viewpoint of the media surface. Main pole 200 of magnetic recording transducer 205 is separated from surrounding structures by nonmagnetic gap 203. Main pole 200 has leading edge 202 on the leading side of main pole 200 and a trailing edge 201 on the trailing side of main pole 200. Recording transducer 205 has side shield areas 230 on the sides of main pole 200 between leading shield area 220 and trailing shield area 240. Embodiments of the invention may include magnetic shields in any or all of the side shield areas 230, the leading shield area 220, and/or the trailing shield area 240.

The trapezoidal pole shape 200 shown in FIG. 2a is conventional in perpendicular magnetic recording (PMR); however, other shapes may also be used. FIG. 2b illustrates a trapezoidal shape 200a with optional curved trailing edge 255. FIG. 2c illustrates a pole 200b with triangular shape, and FIG. 2d illustrates a pole 200c with rectangular shape. In FIGS. 2b-d, pole edges with straight lines may also be curved or faceted. In FIGS. 2b-d, the main pole has a leading edge 250, and a trailing edge 260. Those of skill in the art will recognize that these shapes, combinations or variations of these shapes, and other shapes may be used without departing from the spirit of the invention.

FIG. 3 illustrates shield 300 in an embodiment of the invention. Shield 300 comprises plated soft ferromagnetic layers 310 and 330 separated by an AFC trilayer 320. AFC trilayer 320 comprises first sputtered AFC layer 321 formed on and in contact with first plated soft ferromagnetic layer 310. Second sputtered AFC layer 322 is formed on top of first sputtered AFC layer 321, and third sputtered AFC layer 323 formed on top of second sputtered AFC layer 322. Second plated soft ferromagnetic layer 330 is formed on and in contact with third sputtered AFC layer 323.

Figure 4:
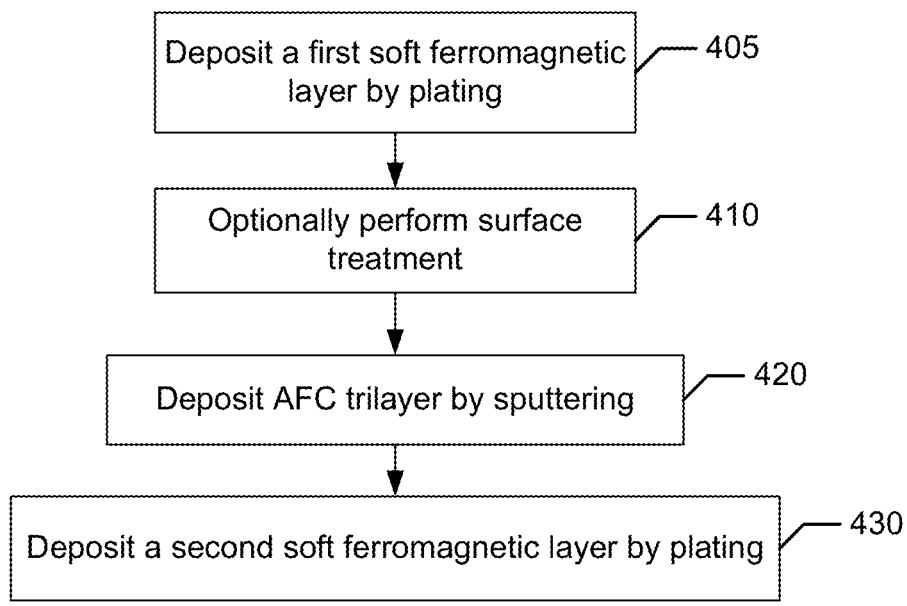
FIG. 4 is a flow chart illustrating fabrication steps for a magnetic shield with an AFC trilayer according to an embodiment of the invention.

FIG. 4 is a flow chart illustrating process 400 for fabrication of a magnetic shield with an AFC trilayer according to an embodiment of the invention. Beginning in block 405, a first soft ferromagnetic material is formed by plating. The surface of first soft ferromagnetic layer deposited in block 405 may optionally be treated in block 410 to provide a desired roughness or texture. Surface treatment may be, for example, by milling. After plating the first soft ferromagnetic layer and optionally treating the surface, an AFC trilayer is sputtered on and in contact with the first soft ferromagnetic surface in block 420. After depositing the AFC trilayer in block 420, a second soft ferromagnetic layer is deposited on and in contact with the AFC trilayer by plating in block 430.

Figure 5:
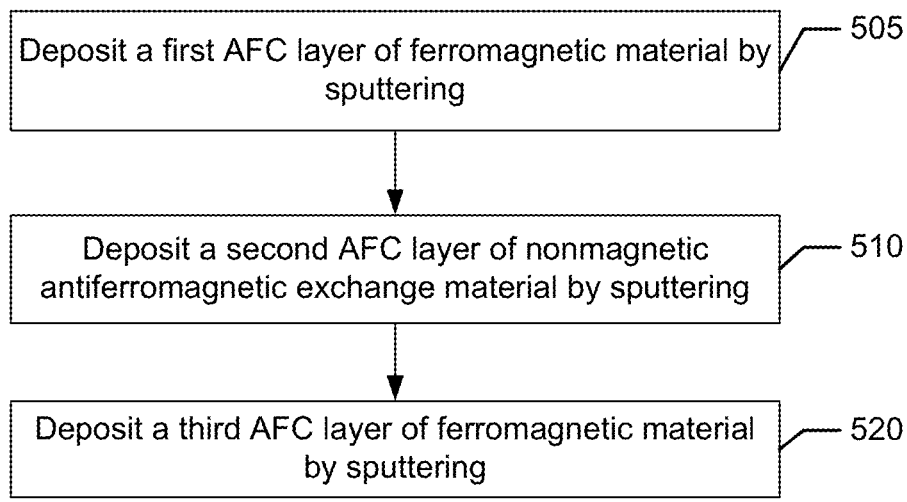
FIG. 5 is a flow chart illustrating fabrication steps for a trilayer according to an embodiment of the invention.

FIG. 5 is a flow chart illustrating process 500 for fabrication of a trilayer according to an embodiment of the invention. Process 500 may be used for depositing an AFC trilayer as shown in FIG. 4, block 420. As described in FIG. 4, a first soft ferromagnetic layer is plated and the surface is optionally treated in block 410. Beginning in block 505 of FIG. 5, a first AFC layer of ferromagnetic material is sputtered on and in contact with a plated soft ferromagnetic layer. In block 510, a second AFC layer of nonmagnetic antiferromagnetic exchange material is deposited on top of the first AFC layer by sputtering. In step 520, a third AFC layer of ferromagnetic is deposited on top of the second AFC layer by sputtering. After the third AFC layer is deposited, the AFC trilayer is complete; and a second soft ferromagnetic layer is deposited by plating as described in FIG. 4, block 430.

In an embodiment of the invention, the sputtering described in process 500 blocks 505 and 520 may be in a magnetic field oriented in the same plane as the ABS. In another embodiment of the invention, the magnetic field may be further oriented in a cross-track direction.

In an embodiment of the invention, the nonmagnetic antiferromagnetic exchange material described in FIG. 3 second AFC layer 322 and FIG. 5 block 510 comprises at least one of Ru, Cr, Os, Ir, Re, Rh, Nb, Ta, Ti, Zr, Hf, Mo, or W; where Ru is ruthenium, Cr is chromium, Os is osmium, Ir is iridium, Re is rhenium, Rh is rhodium, Nb is niobium, Ta is tantalum, Ti is titanium, Zr is zirconium, Hf is hafnium, Mo is molybdenum, and W is tungsten.

In an embodiment of the invention, the plated soft ferromagnetic layers described in shield 300 of FIG. 3, first soft ferromagnetic layer 310 and second soft ferromagnetic layer 330 comprises ferromagnetic material with coercivity less than 100 Oersteds (Oe). In a further embodiment of the invention, the ferromagnetic material may comprise at least one of cobalt (Co), nickel (Ni), and iron (Fe). In yet another embodiment of the invention the ferromagnetic material may comprise Ni80Fe20 or Ni45Fe55.

In another embodiment of the invention, the nonmagnetic antiferromagnetic exchange material 322 in shield 300 of FIG. 3, and further described in FIG. 5 block 510, the thickness of the nonmagnetic antiferromagnetic exchange material layer is one of:
  between approximately 0.31 nm and 0.39 nm;
  between approximately 0.69 nm and 0.105 nm, and
  between approximately 1.52 nm and 1.69 nm.

In yet another embodiment of the invention, the thickness of the trilayer 320 shown in shield 300 of FIG. 3, and also described in process 400 block 420 in FIG. 4, is between 1 nm and 100 nm; and the thickness of the plated soft ferromagnetic layers shown in layers 310 and 330 of FIG. 3, and also described in blocks 400 and 430 of FIG. 4, is greater than 200 nm.

In other embodiments of the invention, the AFC trilayer 320 is sputtered at a temperature between 20° C. and 50° C. and not annealed after sputtering. In an alternative embodiment, the AFC trilayer 320 is sputtered at a temperature between 20° C. and 50° C. and subsequently annealed in the presence of a magnetic field oriented in the same plane as an air bearing surface of the magnetic recording transducer, and optionally further oriented in a cross track direction.

In the foregoing embodiments, pinning layers may be absent from the AFC trilayers and the soft ferromagnetic layers adjacent to the trilayers.

Figure 6:
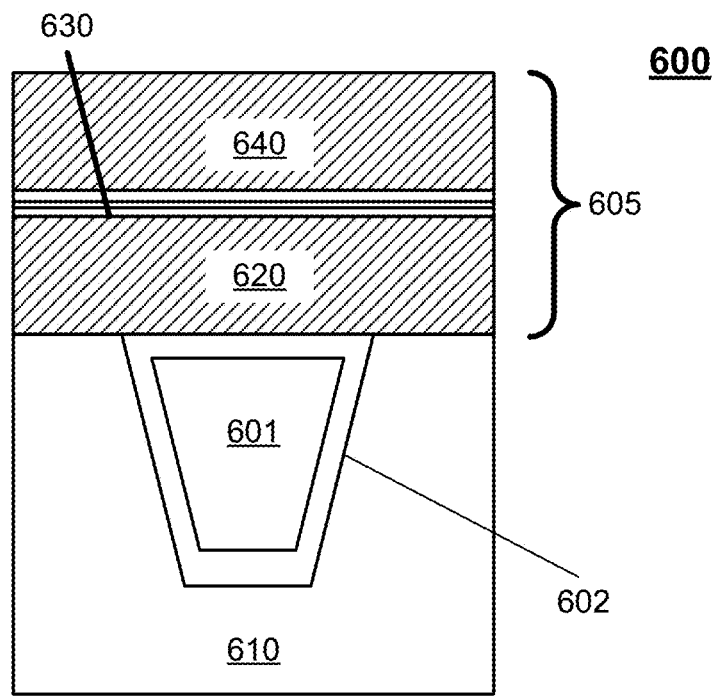
FIG. 6 illustrates an embodiment of the invention with an AFC trilayer in a trailing shield.

FIG. 6 illustrates an embodiment of the invention showing recording transducer 600 with AFC trilayer 630 in a trailing shield. Main pole 601 is formed in intermediate material 610 and separated from intermediate material 610 by nonmagnetic gap 602. In an embodiment, intermediate material 610 may be alumina and nonmagnetic gap 602 may be a thin layer of carbon or alumina. Trailing shield 605 with AFC trilayer 630 is formed above main pole 601. Trailing shield 605 comprises first plated soft ferromagnetic layer 620, AFC trilayer 630, and second plated soft ferromagnetic layer 640.

Figure 7:
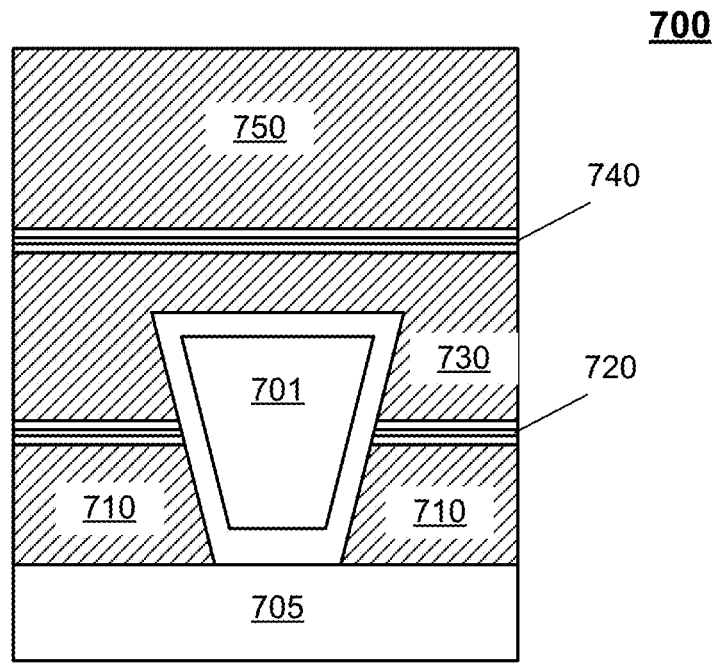
FIG. 7 illustrates an embodiment of the invention with a wrap around shield and AFC trilayers in the side shield area and trailing shield area.

FIG. 7 illustrates an embodiment of the invention showing magnetic transducer 700 with a wrap around shield. First AFC trilayer 720 is in the side shield area, and second AFC trilayer is in the trailing shield area. The expression "wrap around shield" refers to magnetic shields in both the side shield areas and trailing shield area of the main pole 701. In FIG. 7, main pole 701 is formed above intermediate layer 705. First soft ferromagnetic layer 710 is plated on the sides of main pole 701. First AFC trilayer 720 is formed on and in contact with first soft ferromagnetic layer 710. Second soft ferromagnetic layer 730 is plated on and in contact with first trilayer 720. Second soft ferromagnetic layer 730 is used as the underlayer for second AFC trilayer 740 which is formed on and in contact with plated soft ferromagnetic layer 730. Plated soft ferromagnetic layer 730 is in contact with first trilayer 720 and second trilayer 740. Third soft ferromagnetic layer 750 is plated on and in contact with second AFC trilayer 740.

In alternate embodiments of FIG. 7, first AFC trilayer 720 may be in any position in the side shield area, including aligned with the leading edge or trailing edge of main pole 701. In other alternate embodiments of FIG. 7, AFC trilayer 740 may be in any position in the trailing shield area, including aligned with the trailing edge of main pole 701. Alignment of AFC trilayers with leading edge and/or trailing edges of the main pole 701 may be approximate; they may be aligned on the nonmagnetic gap, above the nonmagnetic gap, or below the nonmagnetic gap. Position of the AFC trilayer may vary to accommodate precursor or subsequent process steps, or may be optimized to a particular design without departing from the spirit of the invention.

Figure 8:
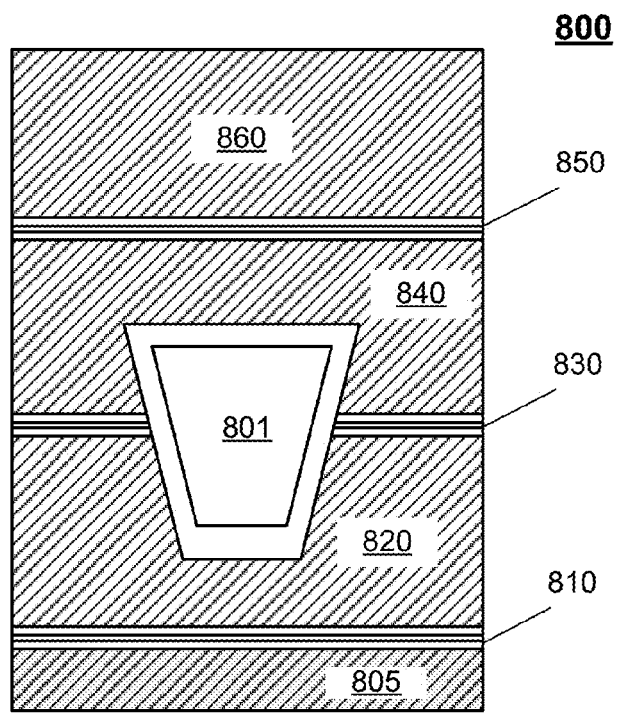
FIG. 8 illustrates an embodiment of the invention with a full wrap around shield and AFC trilayers in the leading shield area, side shield area, and trailing shield area.

FIG. 8 illustrates an embodiment of the invention showing magnetic transducer 800 with full wrap around shield and AFC trilayers in the bottom shield area, side shield areas, and top shield area. The expression "full wrap around shield" refers to magnetic shields in the leading shield area, side shield areas, and trailing shield area of the magnetic transducer. In FIG. 8, a first plated soft ferromagnetic layer 805 is provided. First AFC trilayer 810 is formed on and in contact with first plated soft ferromagnetic layer 805. Second plated soft ferromagnetic layer 820 is plated on and in contact with first AFC trilayer 810.

Still referring to FIG. 8, main pole 801 is formed in second plated soft ferromagnetic layer 820. Second plated soft ferromagnetic layer 820 and main pole 801 may be formed by any suitable process. In one process example, a trench may be formed in layer 820 or in a combination of layers 820, 830, and 840; and main pole 801 formed into the trench followed by steps to form the remaining side or trailing shields. In another process example, a first part of layer 820 may be plated, main pole 801 formed on top the first part of layer 820, and the remaining part of layer 820 plated after the pole 200 is formed.

After second soft plated ferromagnetic layer 820 is formed, second AFC trilayer 830 is formed on and in contact with second soft plated ferromagnetic layer 820. Third soft plated ferromagnetic layer 840 is formed on and in contact with second AFC trilayer 840. In the same manner, third AFC trilayer 850 and fourth plated soft ferromagnetic layer 860 are formed.

Figure 9:
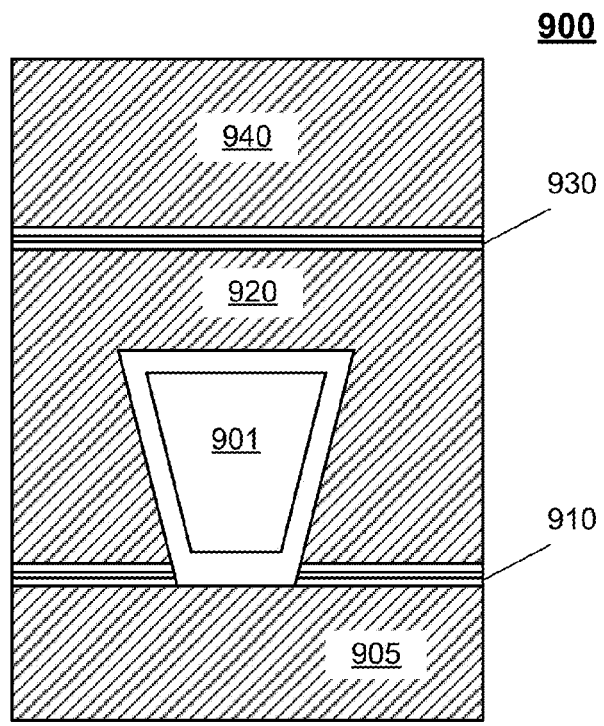
FIG. 9 illustrates an embodiment of the invention in a full wrap around shield with an AFC trilayer between a leading shield and a side shield.

FIG. 9 illustrates an embodiment of the invention showing magnetic transducer 900 with a full wrap around shield with and AFC trilayer 910 between leading shield 905 and wrap around shield 920. Main pole 901 is formed above leading shield 905. First AFC trilayer 910 is formed on top of leading shield 905 and wrap around shield 920 is plated over the main pole. Second AFC trilayer 930 and plated soft ferromagnetic layer 940 may optionally be added in the same manner as previously described in magnetic transducer 700.

Figure 10:
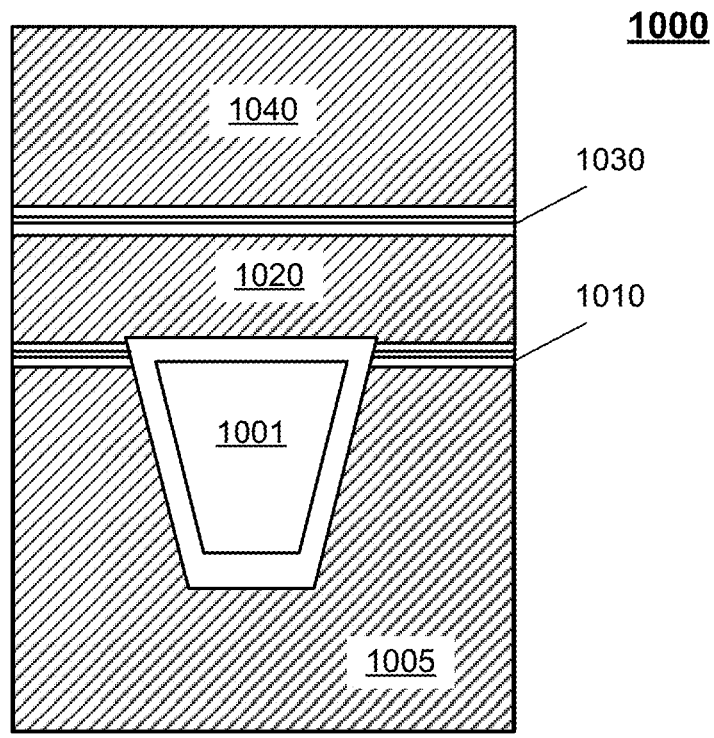
FIG. 10 illustrates an embodiment of the invention in a full wrap around shield with an AFC trilayer between the side shield and the trailing shield.

FIG. 10 illustrates an embodiment of the invention for magnetic transducer 1000 with a full wrap around shield and AFC trilayer 1010 between the combined leading and side shields 1005 and trailing shield 1020. In FIG. 10, First plated soft ferromagnetic layer 1005 is provided with main pole 1001 formed within. First AFC trilayer 1010 is formed on and in contact with first plated soft ferromagnetic layer 1005. Second soft plated ferromagnetic layer 1020 is formed on top of AFC trilayer 1010 to form trailing shield 1020. Optional second AFC trilayer 1030 and plated soft ferromagnetic layer 1040 may also be incorporated into the trailing shield in the same manner as described in magnetic transducer 700.

Figure 11:
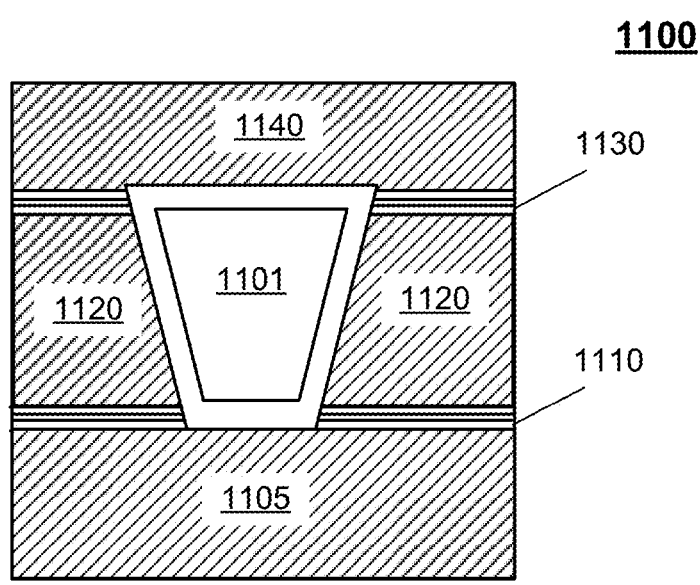
FIG. 11 illustrates an embodiment of the invention in a full wrap around shield with an AFC trilayer between the leading shield and the side shields, and an AFC trilayer between the side shields and the trailing shield.

FIG. 11 illustrates an embodiment of the invention of a magnetic transducer 1100 having a pole 1101 with a full wrap around shield having first AFC trilayer 1110 between the trailing shield 1105 and side shields 1120; and second AFC trilayer 1130 between side shields 1120 and trailing shield 1140.

Figure 12:
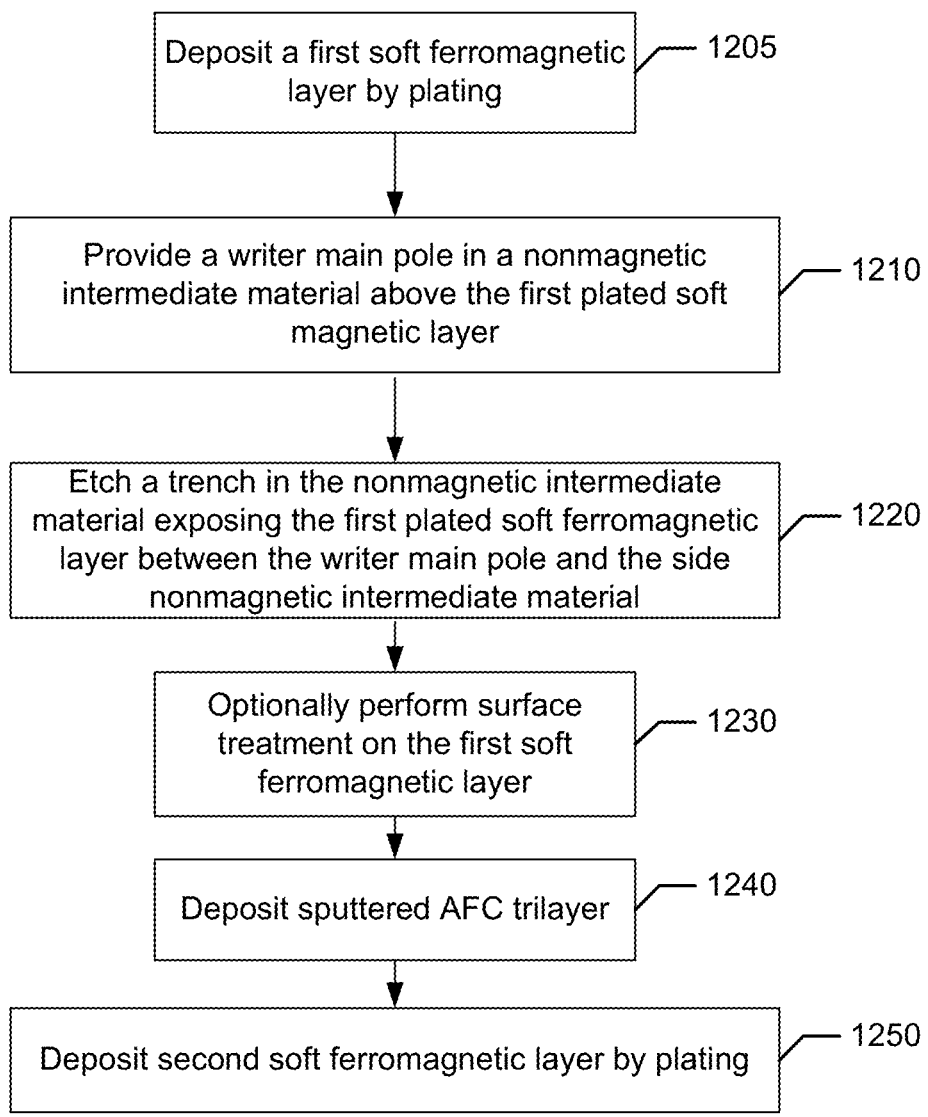
FIG. 12 is a flow chart illustrating fabrication steps to provide an AFC trilayer between a leading shield and a side shield according to an embodiment of the invention.

FIGS. 9 and 11 illustrate embodiments of the invention of magnetic transducers with full wrap around shields and AFC trilayer between the leading shields and side shields. FIG. 12 is a flow chart illustrating fabrication process 1200 to provide a magnetic transducer with an AFC trilayer between leading shields and side shields according to an embodiment of the invention.

Beginning in block 1205, a first soft ferromagnetic layer is plated onto any suitable underlayer to form a leading shield of a full wrap around shielded magnetic transducer. In block 1210, a writer main pole is provided above the first plated soft ferromagnetic layer in an intermediate nonmagnetic material. The writer main pole may be provided by forming a trench in the intermediate nonmagnetic material; or the pole may be formed first and the intermediate nonmagnetic material added after forming the pole. The intermediate material may be for example, alumina. Alternatives for providing writer main poles are known in the art; and any suitable method may be used without departing from the spirit of the invention.

In block 1220, a trench is etched into the nonmagnetic intermediate material exposing the first plated soft ferromagnetic layer between the writer main pole and the side nonmagnetic intermediate material, thereby forming side shield area trenches.

In block 1230, the exposed first plated soft ferromagnetic layer surface may be optionally treated, for example, by milling. In block 1240 an AFC trilayer is deposited by sputtering as described in process 500; and followed in block 1250 by plating a second soft ferromagnetic layer.

FIGS. 13-21 illustrate a fabrication process to provide an AFC trilayer between a leading shield and a side shield according to an embodiment of the invention.

Figure 13:
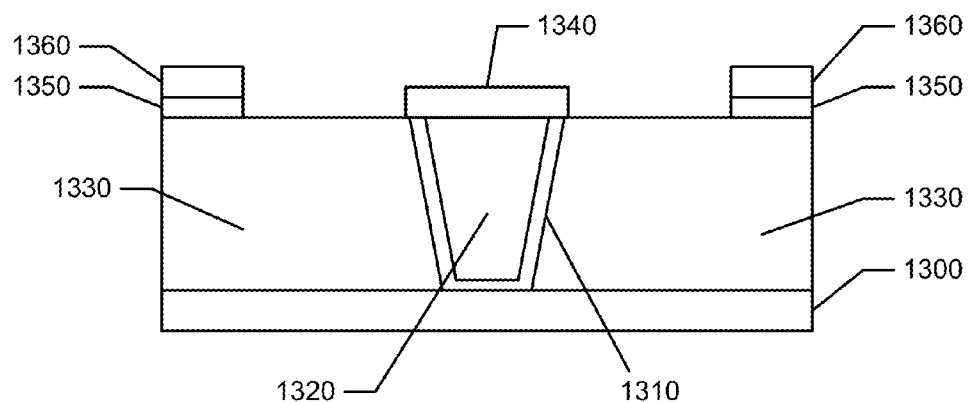
FIGS. 13-21 illustrate a fabrication process to provide an AFC trilayer between a leading shield and a side shield according to an embodiment of the invention.

Beginning in FIG. 13, writer main pole 1320 is provided in nonmagnetic intermediate material 1330 above a leading plated soft ferromagnetic layer 1300 and separated by nonmagnetic gap 1310. In an embodiment, nonmagnetic intermediate material 1330 may be alumina. Hard mask 1340 is provided above writer main pole 1320 to protect the pole during subsequent operations, and may be any suitable material. Hard mask layers 1350 and 1360 may be provided to provide masking and/or stop layers for subsequent process operations. In an embodiment, hard mask 1350 may comprise Ta, and hard mask 1360 may comprise Ru.

Figure 14:
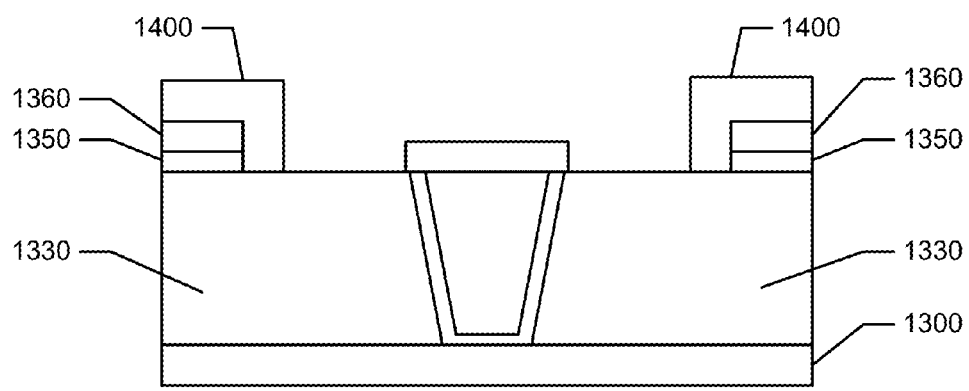

In FIG. 14, photoresist 1440 is patterned above nonmagnetic intermediate material 1330 and hard masks 1350 and 1360 to prepare for wet etching of side shield areas.

Figure 15:
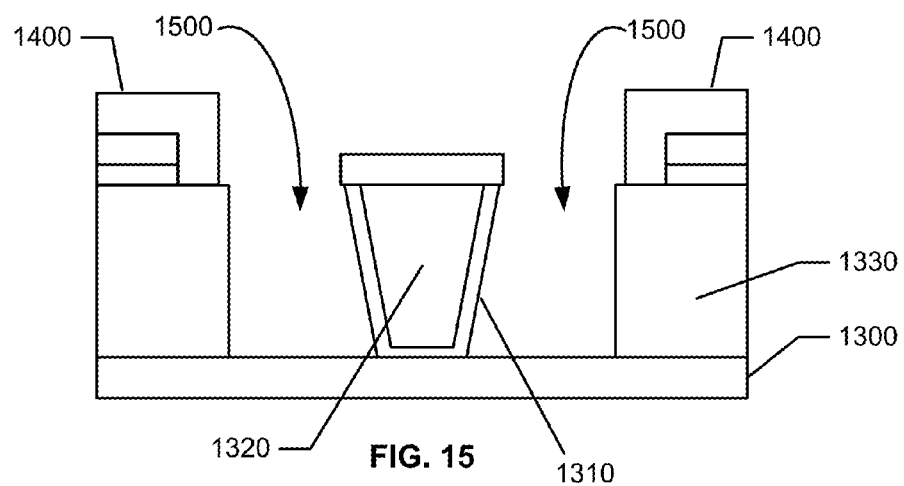

In FIG. 15, wet etching is performed to open side shield areas 1500 that were patterned by photoresist 1400 between the magnetic gap 1310 and the nonmagnetic intermediate material 1330; also exposing the leading soft ferromagnetic layer 1300. After wet etching, photoresist 1440 may be removed. Dry etching may also be used to form trench 1500.

Figure 16:
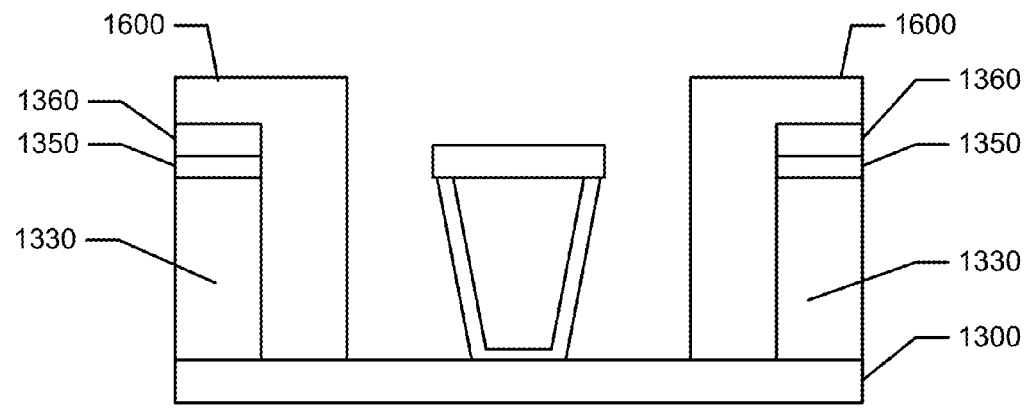

In FIG. 16, photoresist pattern 1600 defines the side shield geometry over the hard masks 1350 and 1360.

Figure 17:
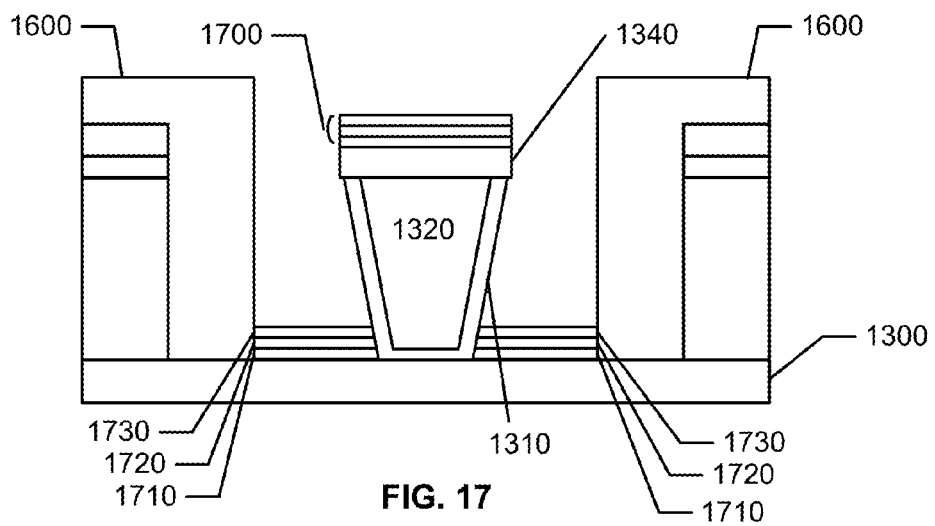

FIG. 17 illustrates depositing of AFC layers 1710, 1720, and 1730 that form the AFC trilayer. These layers are deposited as described in process 500. During the deposition, AFC trilayer material 1700 may be deposited on the hard mask 1340 at the trailing edge of the main pole. Nonmagnetic gap 1310 separates the AFC trilayer form the writer main pole 1320.

Figure 18:
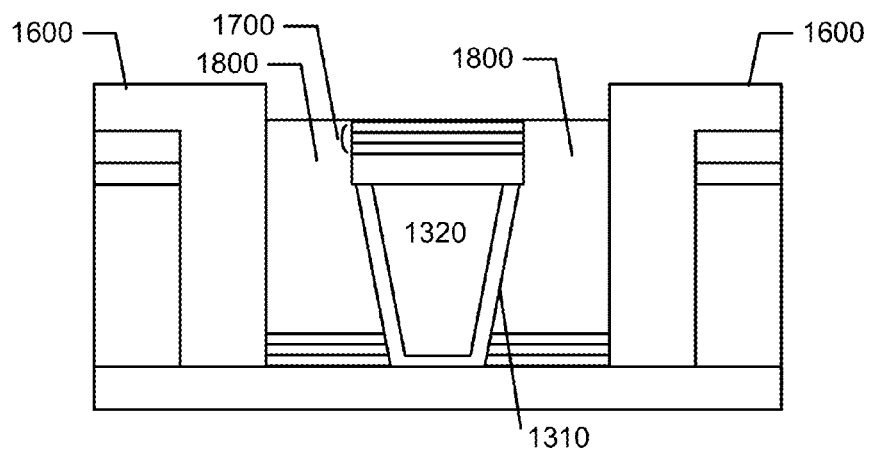
Figure 19:
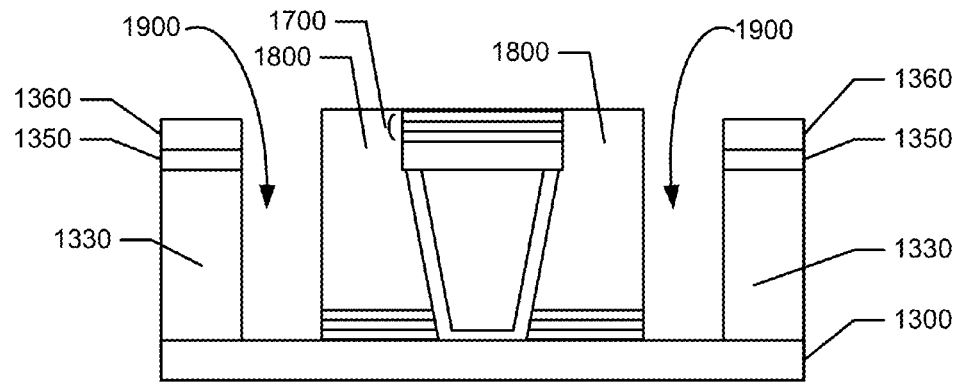
Figure 20:
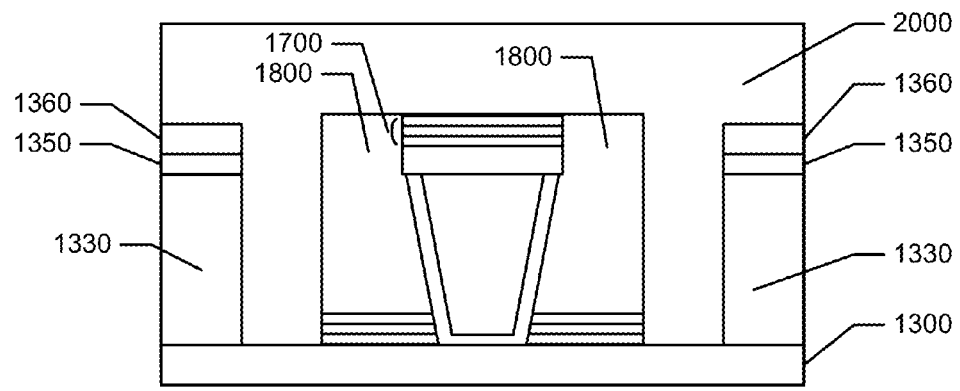

FIG. 18 illustrates side shields 1800 deposited by plating ferromagnetic material. Nonmagnetic gap 1310 separates the side shield ferromagnetic material 1800 from the writer main pole 1320. In FIG. 19, the photoresist mask is removed, forming trenches 1900 between the ferromagnetic side shields 1800 and the nonmagnetic intermediate material 1330. In FIG. 20, the trenches 1900 are refilled with nonmagnetic material. The nonmagnetic material may be the same material as nonmagnetic material 1330.

Figure 21:
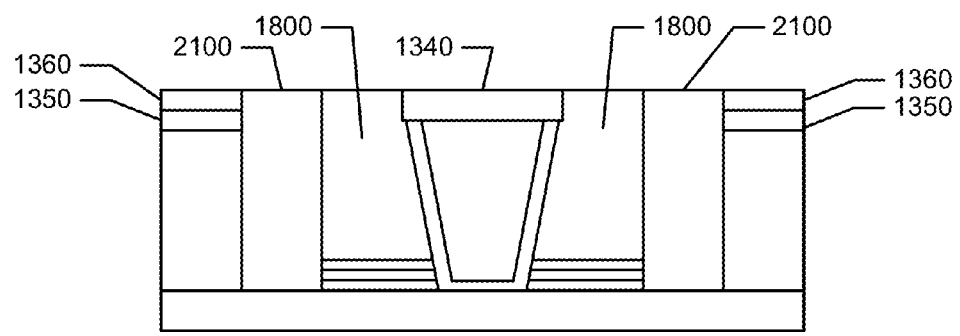

In FIG. 21, the surface is planarized down to hard mask 1340, and/or 1360. Chemical mechanical polishing (CMP) may be used to planarize the surface, although other methods such a milling may work as well. Subsequent steps may be conventional, or may include additional AFC trilayers as described in magnetic transducer 1100.

FIGS. 13-21 illustrate a method for fabricating a magnetic transducer. The method is described in the context of a PMR transducer, though other transducers might be so fabricated. For simplicity, some steps may be omitted and/or combined. The transducer being fabricated may be part of a merged head that also includes a read head (not shown) and resides on a slider (not shown) in a disk drive. The method also may commence after formation of other portions of the transducer. The method is also described in the context of providing a shield for a single main pole in a single magnetic recording transducer. However, the method may be used to fabricate multiple shields and/or multiple transducers at substantially the same time. The method and system are also described in the context of particular layers. However, in some embodiments, such layers may include multiple sub-layers. In one embodiment, the method commences in FIG. 13 after formation of the main pole. The main pole resides in an intermediate material, such as alumina. The main pole may be a PMR pole having its top wider than its bottom. In addition, a top trailing edge bevel may also be provided in the pole. A bottom leading edge bevel may also be provided in the pole. The magnetic transducer may also include field regions that extend greatly from the main pole. For example, the field regions may be three to six microns or more from a wrap-around shield to be fabricated on the main pole. In some embodiments, a stop layer, such as a Ru stop layer may also be deposited on the top surface of the main pole and the intermediate layer adjacent to the main pole prior to the method shown in FIGS. 13-21 commencing.

Magnetic shields are used in magnetic transducers for various reasons. In some embodiments, magnetic shields function by providing an attractive path for magnetic flux where it may be harmlessly dissipated, for example, in soft ferromagnetic material.

In one application using magnetic shielding, a magnetic writer pole may be shielded to control direction of magnetic write flux and prevent unwanted magnetic flux emanating in an undesirable direction. In a disk drive recording transducer, shields may prevent a writer from overwriting or degrading adjacent areas, or possibly erasing data. In another disk drive example, a magnetoresistive read sensor senses magnetic flux from a written medium, and reader shields can prevent a unwanted flux from nearby areas on the head or the medium from being sensed by the sensor, thereby improving signal to noise ratio.

Magnetic shields themselves can become noise sources in highly sensitive environments. Shields may become saturated and lose effectiveness, or they may have magnetic domains that change magnetic orientation in an undesirable manner. Such domain switching can induce noise into a read or write transducer, for example.

Some embodiments of the present invention provide magnetic shields that improve magnetic shielding and/or reduce undesirable effects from shields. Embodiments using an AFC trilayer according to the invention may improve the shield performance by reducing noise from magnetic domain switching within the shields. In some embodiments, the use of multiple AFC trilayers may further reduce shield disorder. The use of sputtered ferromagnetic material and plated soft ferromagnetic layers provides improved ferromagnetic order and performance with lower noise.

Although the foregoing has been described in terms of certain embodiments, other embodiments will be apparent to those of ordinary skill in the art from the disclosure herein. For example, in an alternative embodiment, multiple AFC trilayers may be incorporated in leading, side, or trailing shield areas, or may be omitted from any of the leading, side or trailing shield areas. In other alternative embodiments, shields may be tilted, angled, or irregular in shape, while incorporating the AFC trilayers in a similar manner. The described embodiments have been presented by way of example only and are not intended to limit the scope of the disclosure. Indeed, the novel methods and systems described herein may be embodied in a variety of other forms without departing from the spirit thereof. Thus, the invention is not limited by any preferred embodiments, but is defined by reference to the appended claims.

We claim:

1. A magnetic recording transducer for use in a data storage device, comprising
a writer pole having a trailing edge and a plurality of sidewalls;
at least one magnetic shield including a side shield, the side shield comprising a first plated soft ferromagnetic layer, a second plated soft ferromagnetic layer, and a plurality of antiferromagnetic coupling (AFC) trilayers and a single plated soft ferromagnetic layer in contact with two of the plurality of AFC trilayers, an AFC trilayer of the plurality of AFC trilayers being between the first plated soft ferromagnetic layer and the second plated soft ferromagnetic layer, the side shield being adjacent to a sidewall of the plurality of sidewalls, wherein the AFC trilayer comprises:
a first AFC layer comprising sputtered ferromagnetic material;
a second AFC layer comprising a nonmagnetic antiferromagnetic exchange material, and
a third AFC layer comprising sputtered ferromagnetic material.

2. The magnetic recording transducer in claim 1, wherein: the first AFC layer and third AFC layer are not pinned by a pinning layer.

3. The magnetic recording transducer in claim 1, wherein: the AFC trilayer is in contact with the first and the second plated soft ferromagnetic layers.

4. The magnetic recording transducer in claim 1, wherein: the first and third AFC layers are sputtered in the presence of a magnetic field oriented in the same plane as an air bearing surface of the magnetic recording transducer.

5. The magnetic recording transducer in claim 4, wherein: the magnetic field is oriented in a cross track direction.

6. The magnetic recording transducer in claim 1, wherein: the nonmagnetic antiferromagnetic exchange material comprises at least one of Ru, Cr, Os, Ir, Re, Rh, Nb, Ta, Ti, Zr, Hf, Mo, or W.

7. The magnetic recording transducer in claim 1, wherein: the plated soft ferromagnetic layers comprise ferromagnetic material with coercivity less than 100 Oe.

8. The magnetic recording transducer in claim 1, wherein: at least one of the AFC layers comprises at least one of Co, Ni, and Fe.

9. The magnetic recording transducer in claim 1, wherein: at least one of the plated soft ferromagnetic layers comprises Ni80Fe20 or Ni45Fe55.

10. The magnetic recording transducer in claim 1, wherein: the thickness of the nonmagnetic antiferromagnetic exchange material layer is one of:
between approximately 0.31 nm and 0.39 nm;
between approximately 0.69 nm and 0.105 nm, and
between approximately 1.52 nm and 1.69 nm.

11. The magnetic recording transducer in claim 1, wherein: the thickness of the trilayer is between 1 nm and 100 nm, and
the thickness of the plated soft ferromagnetic layers is greater than 200 nm.

12. The magnetic recording transducer in claim 1, wherein: the AFC trilayer is sputtered at a temperature between 20° C. and 50° C. and not annealed after sputtering.

13. The magnetic recording transducer in claim 1, wherein: the AFC trilayer is sputtered at a temperature between 20° C. and 50° C. and subsequently annealed in the presence of a magnetic field oriented in the same plane as an air bearing surface of the magnetic recording transducer, and further oriented in a cross track direction.

14. The magnetic recording transducer in claim 1, wherein:
the at least one magnetic shield is part of a wraparound shield.

15. The magnetic recording transducer in claim 1, wherein:
the writer pole is formed on a nonmagnetic gap layer;
the nonmagnetic gap layer is formed on an additional plated soft ferromagnetic layer.

16. A magnetic recording transducer for use in a data storage device, comprising:
a writer pole having a plurality of sidewalls, a leading edge and a trailing edge;
at least one magnetic shield including a side shield and at least one of a trailing shield and a leading shield, the trailing shield being adjacent to the trailing edge, the side shield being adjacent to at least one of the plurality of sidewalls, the leading shield being adjacent to the leading edge; and
an antiferromagnetic coupling (AFC) trilayer, wherein the AFC trilayer comprises:
a first AFC layer comprising sputtered ferromagnetic material;
a second AFC layer comprising a nonmagnetic antiferromagnetic exchange material, and
a third AFC layer comprising sputtered ferromagnetic material;
wherein the AFC trilayer is located in at least one of between a trailing shield and a side shield and between the side shield and a leading shield, the side shield including a first plated soft magnetic layer and the trailing shield including a second plated soft ferromagnetic layer if the AFC trilayer is between the trailing shield and the side shield, the leading shield including the first plated soft ferromagnetic layer and the side shield including the second plated soft ferromagnetic layer if the AFC trilayer is between the side shield and the leading shield.

17. A disk drive comprising:
a slider including a magnetic transducer, the magnetic transducer including:
a main writer pole having a trailing edge and a plurality of sidewalls;
at least one magnetic shield, the at least one magnetic shield including a side shield adjacent to a sidewall of the plurality of sidewalls;
the side shield further comprising:
a first plated soft ferromagnetic layer;
a second plated soft ferromagnetic layer; a plurality of antiferromagnetic coupling (AFC) trilayers, each of the plurality of AFC trilayers including a first AFC layer comprising sputtered ferromagnetic material, a second AFC layer comprising a nonmagnetic antiferromagnetic exchange material, and a third AFC layer comprising sputtered ferromagnetic material; and
a single plated soft ferromagnetic layer in contact with two of the plurality of AFC trilayers, an AFC trilayer of the plurality of AFC trilayers being a sputtered AFC trilayer and being between the first plated soft ferromagnetic layer and the second plated soft ferromagnetic layer.

18. The disk drive of claim 17 wherein the sputtered AFC trilayer further comprises:
a first AFC layer of sputtered ferromagnetic material;
a second AFC layer of nonmagnetic antiferromagnetic exchange material deposited by sputtering, and
a third AFC layer of sputtered ferromagnetic material.

19. The disk drive in claim 17, wherein:
the sputtered AFC trilayer is not pinned by a pinning layer.

* * * * *